United States Patent [19]

Vitale

[11] 4,193,563

[45] Mar. 18, 1980

[54] APPARATUS FOR CARRYING AND DISPENSING CABLE

[76] Inventor: Carmen Vitale, 86 Montgomery St., Bloomfield, N.J. 07003

[21] Appl. No.: 856,340

[22] Filed: Dec. 1, 1977

[51] Int. Cl.² ............................................. B65H 39/00
[52] U.S. Cl. ................................... 242/85; 224/45 R; 242/85.1
[58] Field of Search ............................ 224/45 R, 45 P; 242/129.6, 129.62, 96, 85.1, 100.1, 85

[56] References Cited

U.S. PATENT DOCUMENTS

| | | | |
|---|---|---|---|
| 605,607 | 6/1898 | Koch | 242/85.1 |
| 1,365,762 | 1/1921 | Zinow | 242/85.1 |
| 2,385,197 | 9/1945 | Eisel | 242/85.1 X |
| 2,420,839 | 5/1947 | Ostrom | 242/85.1 |
| 3,529,786 | 9/1970 | Holden | 242/100.1 |
| 3,924,819 | 12/1975 | Lapinskas | 242/85.1 |

*Primary Examiner*—Jerold M. Forsberg
*Attorney, Agent, or Firm*—Martha G. Pugh

[57] ABSTRACT

A method and apparatus for storing and carrying cable, more particularly, insulated electrical cable having male and female terminals, so that a desired length is readily accessible for unwinding or rewinding at either end without disturbing the other end. The present invention comprises a rectangular frame, having three parallel, colinear bars rigidly held in symmetrical, spaced-apart relation by a pair of symmetrically-spaced transversely disposed rungs. The combination may also include a carrying handle and attachment for self-standing. The cable is secured to the middle portion of the central bar, and is wrapped from opposite ends about the upper and lower sections of the rungs, respectively, so that each of the ends is accessible for unwinding to a desired length.

5 Claims, 4 Drawing Figures

APPARATUS FOR CARRYING AND DISPENSING CABLE

BACKGROUND OF THE INVENTION

This relates, in general, to frames for storing and releasing cable, more particularly, insulated electrical cording or extension cords equipped with male and female terminal fittings.

In the prior art, the carrying and winding or unwinding of a long electrical extension cord, either on a construction site or around the home, is, at best, an inconvenience and, at worst, may present a hazard from the presence of lengths of cable lying about bunched up on the floor or ground, tending to trip persons moving about the area. Furthermore, such haphazard treatment of cable tends to produce wear or damage to the insulation, so that the insulated wire may possibly short circuit and start a fire.

SUMMARY OF THE INVENTION

Accordingly, a principal object of the invention is to provide a neat, efficient and safe means for storing or carrying electrical cable. A more particular object of the invention is to provide an electrical cord carrying frame which is designed to alternatively store or release desired lengths of cable either from the male terminal to an electrical outlet point or from the female terminal to a connected electrical tool, leaving the unused central portion neatly stored.

These and other objects are attained in accordance with the present invention in a rectangular grid formed of three colinear, parallel bars which are held in parallel, spaced-apart relation by a pair of colinear, parallel rungs. The latter are preferably disposed in rigid relation to the bars to divide the bars into a central section and two end sections of roughly equal length, whereas the rungs are each divided into an upper and lower section. The frame is preferably of an electrically insulating material, such as wood, plastic, hard rubber or metal covered with a thick layer of insulation. A conventional carrying handle may be screwed or otherwise secured to the upper edge of the top bar. A stand is formed by rotating a pivotally mounted member from its rest position flush with the lower edge of the frame to a position at right angles thereto.

Means is provided for taping or otherwise securing the center of an extension cord to be stored to the middle of the central one of the three parallel bars. The opposite terminals of the cord are then wrapped in opposite directions about the frame so that one end is wound about the upper section of the two rungs, whereas the other end is wound about the lower section of the two rungs, making each of the terminals accessible for unwinding without disturbing the other terminal.

A carrying frame so structured has the advantage of providing a tool for neatly and readily carrying an electric extension cord into the place where it is needed for use with appliances, and storing the cord when in place, thus contributing to safety in the area. The carrying frame of the present invention has the further advantage of allowing the cord to be extended or unwound from the male terminal halfway out, or from the female terminal halfway out, or to be extended for its entire length if need be. In addition, the carrying frame of the present invention functions for quick retrieval, rewind and storage. A further advantage is that the frame is so structured that it can be molded in one piece without the necessity for assembling the individual components separately.

Moreover, the frame offers air circulation around the wound cord to keep it cool during use, and, accordingly, prevents drying, cracking and deterioration of the insulation.

These and other objects, features and advantages can be better understood from a detailed study of the specification hereinafter with reference to the attached drawings.

DETAILED DESCRIPTION

Figure 1:
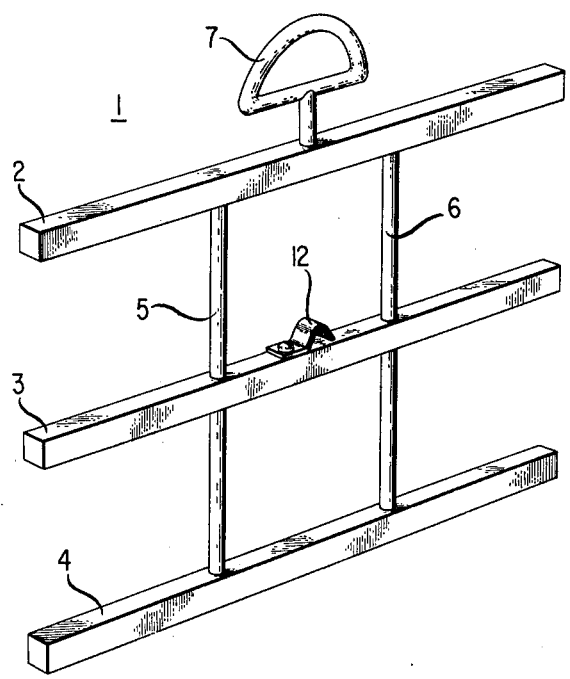
FIG. 1 is a front perspective view of the cable carrying and limiter frame of the present invention.

Referring to FIG. 1 of the drawings, the electric cord feeder and limiter carry frame 1, according to the present invention, comprises a basic grid of five members, of which colinear bars 2, 3 and 4 are shown in a horizontal position. In the present illustrative example, these may take the form of rectangular bars approximately 12" long and 1⅛" square. Members 2, 3 and 4 are held in parallel, colinear relation and are supported by vertically disposed members 5 and 6. The latter are rungs which are, say, ⅜" in diameter and 12" long. They are aligned in parallel relation and are rigidly fastened in bores approximately 4" apart, between centers symmetrically spaced from the ends of the middle bar 3. The opposite ends of rungs 5 and 6 terminate and are fixed to corresponding positions on the inside edges of each of bars 2 and 4. Screwed or otherwise secured into a central position on the external upper edge of bar 2 is a carrying handle 7. It will be seen that the handle 7 may take many alternative forms, such as that of 7', shown in FIG. 3, which is bolted or screwed, or secured in any other means to the upper edge of bar 2. Alternatively, the handle may be omitted altogether.

Figure 2:
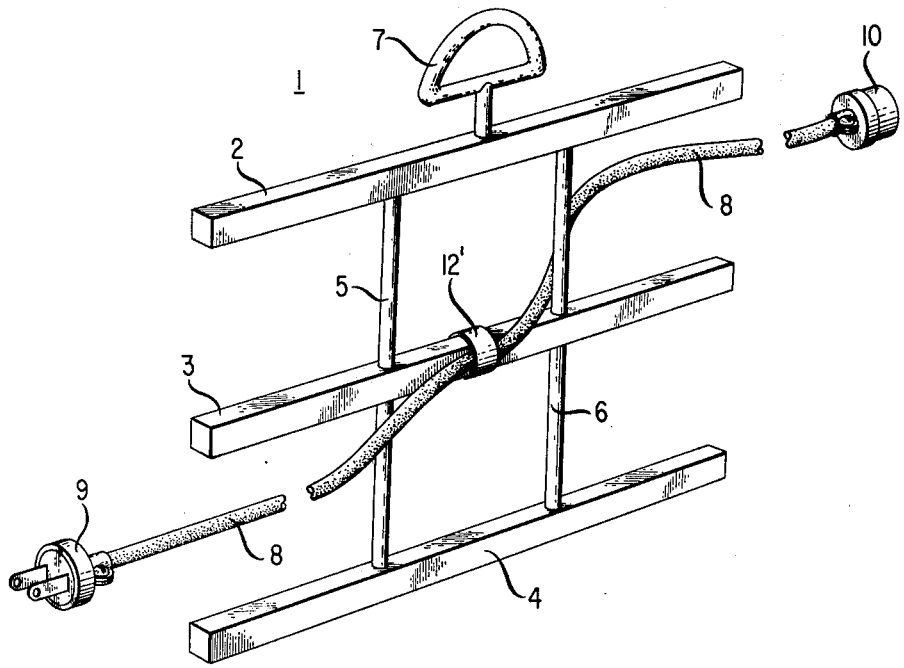
FIG. 2 shows the frame of FIG. 1 on which the wrapping of an extension cord has been initiated.

Returning to FIG. 2, there is shown how an electrical extension cord 8 having male and female terminals 9 and 10 is initially secured onto the carry frame by being attached to center bar 3 by any well-known means. This may take the form of a piece of adhesive tape 12' or, alternatively, an insulated loop or hook, as shown by 12 on FIG. 1. The loop or hook 12 may be fastened to the frame by any well-known means. The cord 8 is designed to be fitted or secured by tape 12' or loop 12 at a central position on bar 3. This serves to hold the extension cord 8 on the carry frame so as to prevent it from sliding off position at the start of the winding from opposite terminals 9 and 10 thereon. It will be seen that the cable 6 is wound in opposite directions from the two ends 9 and 10 onto the frame 1. The female terminal 10 is wound around the upper sections of rungs 5 and 6, whereas the male terminal 9 is separately wound around the lower ends of rungs 5 and 6. The terminals 9 and 10 are secured, as shown in FIG. 4, to prevent the cord from unwinding while being carried or while not in use.

Figure 3:
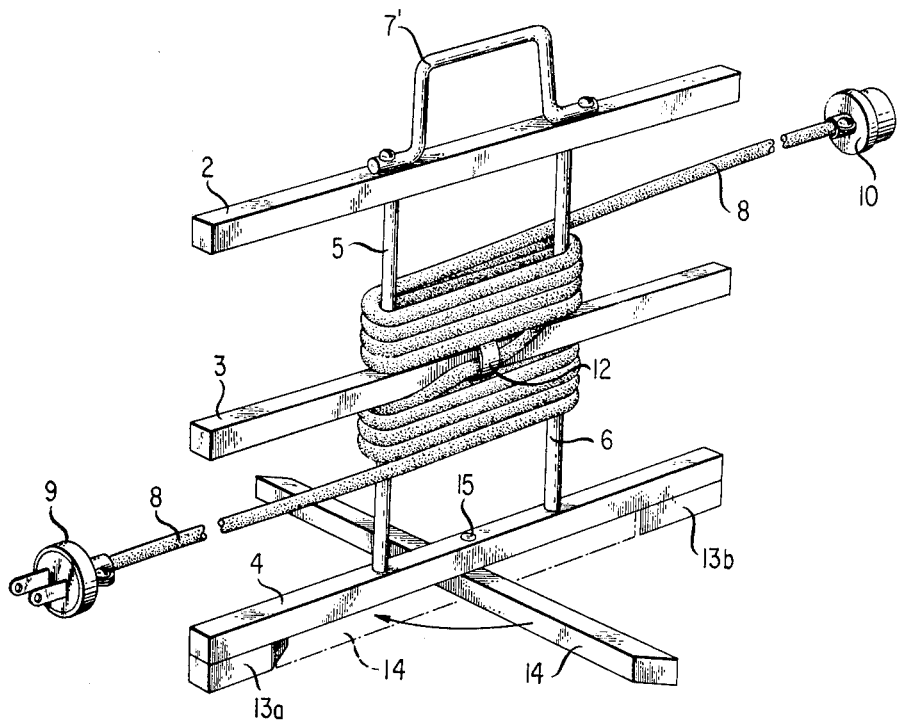
FIG. 3 shows a frame in accordance with the present invention having a modified type of handle and a rotatable standard which is in closed or carrying position. The extension cord has been partly wound on the frame.

FIG. 3 is a front perspective view of carry frame 1 showing cable 8 partly wound onto the upper and lower sections thereof.

Figure 4:
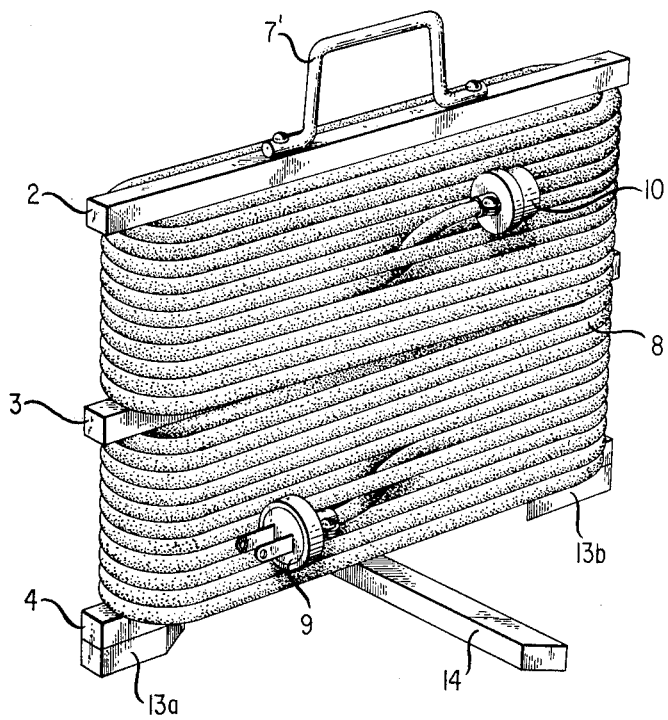
FIG. 4 shows the frame of FIG. 3 fully wound from both the male and female terminals. The standard shown in FIG. 3 has been rotated to selfstanding position.

FIG. 4 shows the two ends of the cord fully wound onto the frame 1 so that terminals 9 and 10 are tucked into the loops to facilitate carrying.

FIGS. 3 and 4 also disclose a swivel-operated standard comprising a rectangular crossbar 14, which is, say, 9" long and 1⅛" square. In preferred form, the ends of swivel bar 14 may be bevelled from front to back at angles of, say, 45°. In closed position of the stand, as shown in phantom in FIG. 3, crossbar 14 is disposed flush with the lower surface of bar 4, with the ends in symmetrical relation to the pivot pin 15, about which it is designed to rotate through a 90° angle to open position, as shown in full line in FIG. 3 and FIG. 4. In order to provide stability in open position of the standard, a pair of mitered blocks 13a, 13b of equal thickness to crossbar 14, forming nontilt heels, are fixed flush to the opposite underends of bar 4. Heel blocks 13a and 13b are 1⅛" square on the bottom in the presently described embodiment, and are mitered at their internal ends at angles of 45° from front to back in inverse relation to the miters at opposite ends of crossbar 14, so as to frictionally engage the latter when the same is disposed in parallel relation beneath the bar 4, thereby preventing further rotation of crossbar 14. Heel blocks 13a and 13b are rigidly attached to crossbar 14 by any well-known means, such as recessed nuts or bolts.

Thus, when crossbar 14 is not in use to support the carry frame 1 in rest position on the floor or ground, it can readily be swivelled back to its closed position beneath bar 4, where the ends thereof will frictionally engage 13a, 13b so that it will not be an obstruction when the frame is carried.

It will be understood that the present invention is not limited to the specific forms, dimensions or materials of the illustrative embodiments disclosed herein by way of example, but only by the scope of the appended claims.

What is claimed is:

1. A frame for storing and dispensing electrical cable or the like which comprises in combination:
   a grid of electrically insulated material formed by three substantially colinear bars rigidly fixed in substantially parallel equally spaced-apart relation by a pair of transverse parallel rungs symmetrically disposed in spaced-apart relation between opposite ends of said bars, thereby forming between them when said frame is in an upright position an upper section and a lower section each forming a discrete winding area, each of which includes a central portion between opposite open ends, said upper section and said lower section each constructed to serve as a spool for separately winding opposite ends of said cable from the central section outward, and
   means for securing a central section of said cable to the central portion of the middle one of said three colinear bars, whereby the cable on one side of the secured central section of said cable is capable of being wound on one of said discrete areas and the cable on the other side of the secured central section of said cable is capable of being wound on the other of said discrete areas.

2. The combination in accordance with claim 1 wherein said means comprises a substantially centered, nonconductive clip on the middle one of said three colinear bars, said clip constructed to frictionally grip the central portion of said cable to prevent slippage during winding.

3. The combination in accordance with claim 1 wherein said means comprises a tape.

4. The combination in accordance with claim 1 which includes a carrying handle interposed at a central position on the upper one of said bars.

5. A frame for storing and dispensing electrical cable or the like which comprises in combination:
   a grid of electrically insulated material formed by three substantially colinear bars rigidly fixed in substantially parallel equally spaced-apart relation by a pair of transverse parallel rungs symmetrically disposed in spaced-apart relation between opposite ends of said bars, thereby forming between them when said frame is in an upright position an upper section and a lower section, each of which includes a central portion between opposite open ends, said upper section and said lower section each constructed to serve as a spool for separately winding opposite ends of said cable from the central portion outward,
   a standard for supporting said frame in an upright standing position comprising a swivel bar pivotally supported to the bottom edge of the lowest one of said three bars, and constructed to move from a closed position flush with said lowest bar to an open position substantially normal to said lowest bar,
   said swivel bar being mitered at its opposite ends,
   said lowest bar having a pair of mitered heels affixed beneath its opposite ends of substantially the same thickness as said swivel bar and constructed to mate with the mitered ends of said swivel bar in closed position, and for stabilizing the position of said frame in an open standing position.

* * * * *